United States Patent [19]
Weaver

[11] Patent Number: 4,579,938
[45] Date of Patent: Apr. 1, 1986

[54] WATER SOLUBLE THIOPHEN-2-YLAZOPYRAZOLE COMPOUNDS AS COLORANTS FOR POLYAMIDES AND WOOL

[75] Inventor: Max A. Weaver, Kingsport, Tenn.

[73] Assignee: Eastman Kodak Company, Rochester, N.Y.

[21] Appl. No.: 597,883

[22] Filed: Apr. 9, 1984

[51] Int. Cl.$^4$ .................. C09B 29/033; C09B 29/46
[52] U.S. Cl. ................................. 534/736; 534/769
[58] Field of Search ............... 260/162, 163, 159, 158, 260/156; 534/769 (U.S. only), 736, 642 (U.S. only), 643

[56] References Cited

U.S. PATENT DOCUMENTS

| | | | |
|---|---|---|---|
| 2,827,451 | 3/1958 | Towne et al. | 260/154 |
| 3,900,460 | 8/1975 | Dehnert | 260/160 |
| 4,301,068 | 11/1981 | Giles et al. | 260/152 |
| 4,400,318 | 8/1983 | Weaver et al. | 260/152 |

Primary Examiner—Charles F. Warren
Assistant Examiner—Carolyn S. Greason
Attorney, Agent, or Firm—Donald W. Spurrell; J. Frederick Thomsen

[57] ABSTRACT

Thiophen-2-ylazopyrazole dyes useful for dyeing polyesters, cellulose acetate esters, and polyamides in fast yellow shades have the general formula

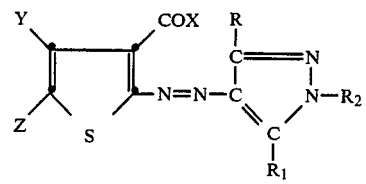

wherein: X is a substituent such as alkyl, allyloxy, alkoxy, aryl, aryloxy, amino, alkylamino, arylamino, cyclohexyloxy, thienyl, cycloalkylamino, or the like; Y is hydrogen, alkyl, or aryl; Z is alkyl, aryl, alkylsulfonyl, 2-benzothiazolyl, cyano or COX; R and $R_1$ are alkyl or aryl; $R_2$ is hydrogen, or a substituent such as alkyl, aryl, acyl, benzothiazolyl, pyridyl, sulfolanyl, thiocarbamyl, carbamyl, alkoxycarbonyl, aroyl, or the like; wherein the hydrocarbon moieties of the above radicals may be substituted with up to three of —OH, alkoxy, hydroxyalkoxy, carbamyl, or the like; and wherein the dye molecule contains at least one $SO_3M$, $OSO_3M$, or $SSO_3M$ water-solubilizing group.

3 Claims, No Drawings

WATER SOLUBLE THIOPHEN-2-YLAZOPYRAZOLE COMPOUNDS AS COLORANTS FOR POLYAMIDES AND WOOL

DESCRIPTION

This invention relates to thiophen-2-ylazopyrazole dyes useful for dyeing polyamides and wool in fast yellow shades.

The present dyes have the general formula

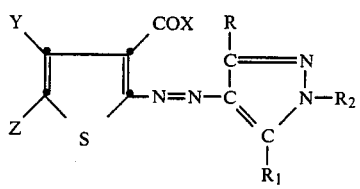

wherein: X is alkyl, allyloxy, alkoxy, aryl, aryloxy, amino, alkylamino, arylamino, cyclohexyloxy, thienyl, cycloalkylamino, N,N-dialkylamino, or N-alkyl-N-arylamino; Y is hydrogen, alkyl, or aryl; Z is alkyl, aryl, alkysulfonyl, 2-benzothiazolyl, cyano or COX; R and $R_1$ are alkyl or aryl; $R_2$ is hydrogen, alkyl, aryl, acyl, benzothiazolyl, pyridyl, sulfolanyl, quinolyl, thiocarbamyl, carbamyl, alkoxycarbonyl, aroyl, arylcarbamyl or alkanoyl; wherein the hydrocarbon moieties of the above radicals may be substituted with up to three of —OH, alkoxy, hydroxyalkoxy, carbamyl, alkylcarbamyl, alkylcarbamyloxy, dialkycarbamyl, arylcarbamyl, arylcarbamyloxy, alkanoylamino, alkanoyl, alkoxycarbonyl, alkanoyloxy, —CF₃, aryloxy, halogen, alkoxyalkoxy, alkoxycarbonyloxy, aryl, —CN, alkenyl, succinimido, phthalimido, furyl, cyclohexyl, or cycloalkyl substituted with hydroxyalkyl; wherein the alkyl groups or moieties within the above definitions of Y, Z, R, $R_1$ and $R_2$ contain from 1-8 carbons, and within the above definition of X contain from 1-10 carbons, and are straight or branched chain; wherein at least one, preferably 1-3, $SO_3M$, $OSO_3M$, or $SSO_3M$ group is present on one or more of X, Y, Z or $R_2$; and wherein M is a colorless anion, preferably, $H^+$, $K^+$, $Na^+$, $Na_4^+$, or $(alkyl)_3NH^+$.

The dyes of this invention dye polyamides and wool in fast yellow shades and are particularly suited for dyeing nylon carpets to give excellent fastness and dyeing properties. The present dyes, in general, also exhibit other improved properties such as one or more of fastness to sublimation, chlorine, heat, ozone, oxides of nitrogen, gas, perspiration, crock, and wash, good build, pH stability, bloom resistance, dye bath exhaustion, depth of shade, leveling, strike rate, migration, and the like.

The present dyes are prepared as shown by the reaction scheme below by diazotizing sutstituted 2-aminothiophenes II and coupling with 1,3-diketo couplers III to produce intermediate compounds IV, followed by reaction with hydrazine or substituted hydrazines to produce the dyes V.

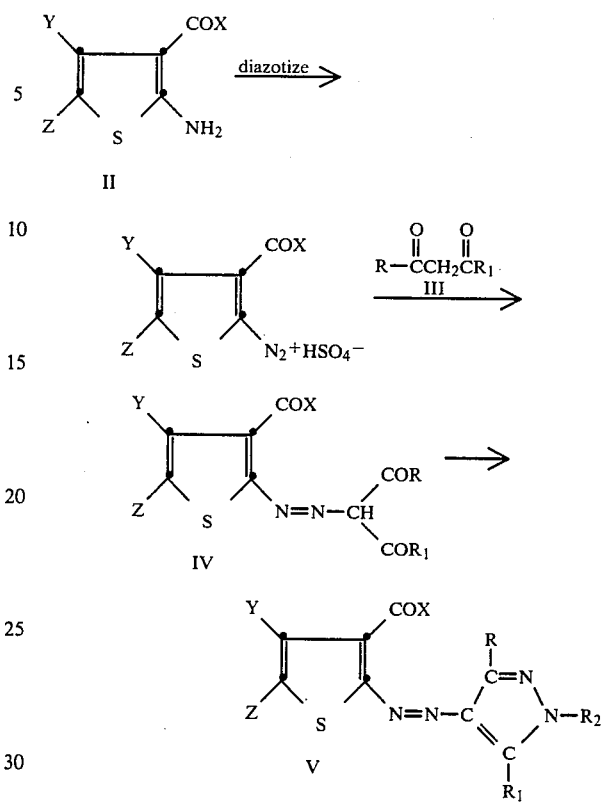

Dyes V, when COX is an amide group, are best prepared by reacting the corresponding dye where X is $OCH_3$ with ammonia or an aliphatic amine. Compounds II are prepared as disclosed in Z. Chem., Volume 2, page 305 (1962); Chem. Ber., Volume 98, page 3571 (1965) and Volume 99, page 2712 (1966); Chem. Heterocyclic Compounds, Volume 2, page 285 (1966) and Volume 3, page 178 (1967). Compounds III and the hydrazines are readily commercially available.

Typical useful hydrazines include the following:

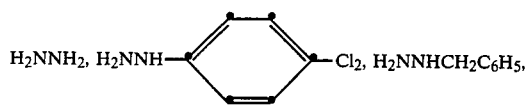

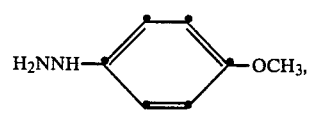

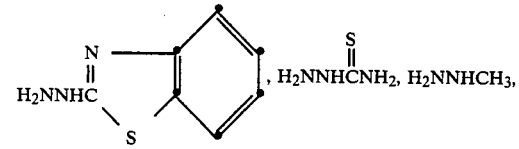

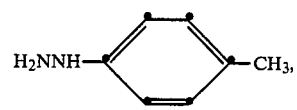

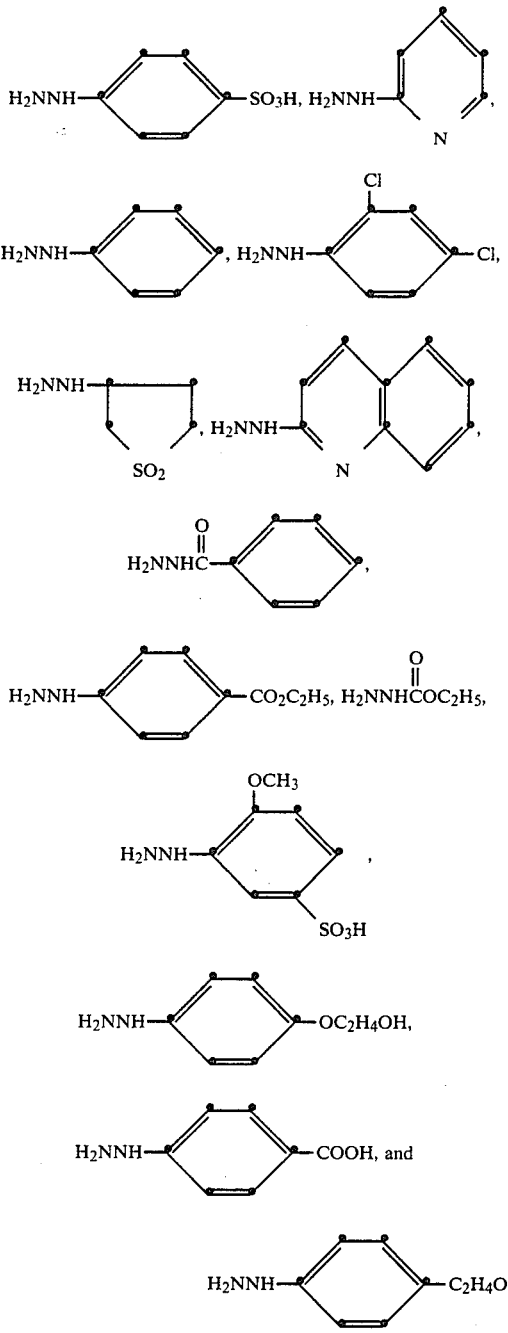

The preferred dyes are those where: X is alkoxy or alkylamine; Y is H or alkyl; Z is carbalkoxy, acyl, CONHaryl, cyano, or aryl; R and $R_1$ are alkyl or aryl; and $R_2$ is H, aryl, alkyl or sulfolanyl; wherein one or more $SO_3M$ or $OSO_3M$ groups are present in the molecule.

The following examples further illustrate the invention.

EXAMPLE 1

Diazotization and Coupling

Sodium nitrite (3.6 g.) was added portionwise to 25 ml of concentrated $H_2SO_4$, allowing the temperature to rise. The solution was cooled and 50 ml of 2:5 acid (2 parts propionic acid:5 parts acetic acid—by volume) was added at <20° C. After further cooling, 2-amino-3,5-dicarbethoxy-4-methylthiophene (12.9 g., 0.05 m) was added at 0°–5° C. and then another 50 ml of 2:5 acid was added at <5° C. Stirring was continued at 0°–5° C. for 1.5 hr.

For the coupling, 2,4-pentanedione (5 g., 0.05 m) was dissolved in about 200 ml of water containing 75 g. of sodium acetate. Crushed ice was added for cooling and the above diazo solution added. Additional water/ice mixture was added as needed as thickening occurred. The reaction mixture was stirred for 15 min. at about 10°–15° C., heated to about 70° C. and filtered hot. The intermediate dye was collected by filtration, washed with water, and dried in air, and has the following structure:

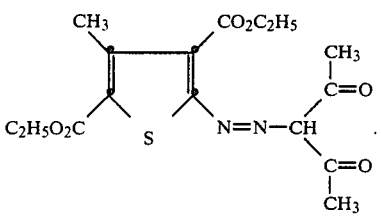

EXAMPLE 2

Reaction With p-Hydrazinebenzenesulfonic Acid

A mixture of the 1,3-diketo dye from Example 1 (1.84 g, 0.005 m), p-hydrazinebenzenesulfonic acid (1.5 g), N,N-dimethylformamide (20 ml), ml water (5 ml) was heated at about 95° C. for 1.5 hr. The solution was drained into 10% NaCl solution (50 ml). After being heated to 70° C., the mixture was filtered and the dye washed with 5% NaCl solution and dried in air. The yield was 2.5 g of dye which has a visible absorption maximum at 401 nm in 50:50 water and acetone and has the following structure

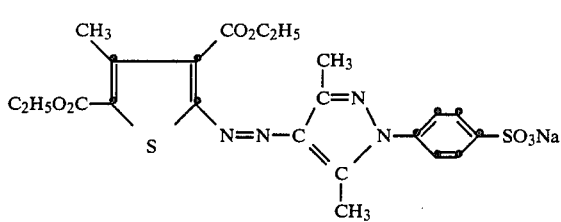

EXAMPLE 3

Reaction With 2-Hydroxyethylhydrazine

The dye derived from diazotizing 2-amino-3,5-dicarbomethoxy-4-methylthiophene and 2,4-pentanedione as illustrated in Example 1 (3.0 g), N,N-dimethylformamide (10 ml), and 2-hydroxyethylhydrazine (1.0 g) were mixed and heated at 65° C. for 5 min. After cooling, methanol (40 ml) was added to precipitate the yellow dye (2.0 g) which was collected by filtration, washed with methanol and dried in air. The dye has the structure

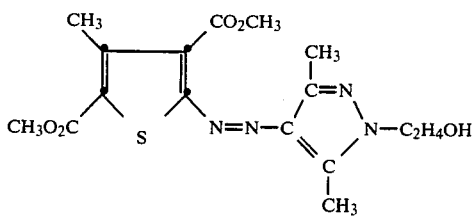

and produces bright yellow shades on cellulose acetate, polyamide, and polyester fibers. This dye can be reacted further on the hydroxyethyl group to give additional functional derivatives.

EXAMPLE 4

Sulfation With Chlorosulfonic Acid

The dye from Example 3 (1.0 g) and N,N-dimethylformamide (15 ml) were stirred together at room temperature. Chlorosulfonic acid (0.5 g) was added dropwise allowing the temperature to rise. Stirring was continued for 15 min., during which time the yellow sulfate crystallized. Acetone (20 ml) was added and then the dye was collected by filtration, washed with acetone, and dried in air. The dye has the structure

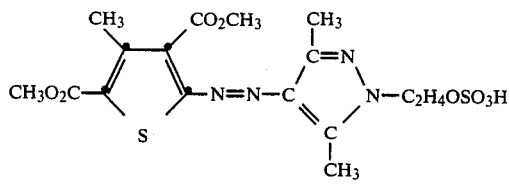

imports bright yellow shades on nylon carpet, and has a visible absorption maximum at 398 nm in 50:50 water and acetone.

EXAMPLE 5

Reaction With p-Methoxyphenylhydrazine.HCl

The 1,3-diketo dye from Example 1 (2.0 g), p-methoxyphenylhydrazine HCl (1.0 g), and N,N-dimethylformamide (10 ml) were mixed and heated at about 95° C. for 2.5 hrs. Ethanol (40 ml) was added to precipitate the dye, which was collected by filtration, washed with water, and dried in air.

The yield was 1.5 g of dye with the following structure

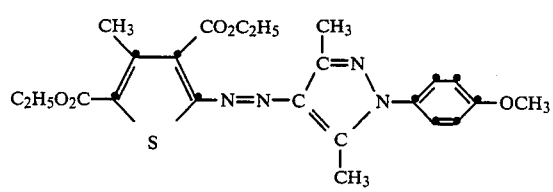

EXAMPLE 6

Sulfonation With Oleum

The dye from Example 5 (1.0 g) was added portionwise with stirring to 10% oleum (10 ml), allowing the temperature to rise to about 35° C. Sulfonation was complete as evidenced by thin-layer chromatography. The reaction mixture was drowned on ice, treated with an equal volume of saturated NaCl solution, and then heated to about 50° C. After allowing the dye to settle, most of the supernatant liquid was decanted and the remaining mixture filtered. The dye was dried in air and had the following structure

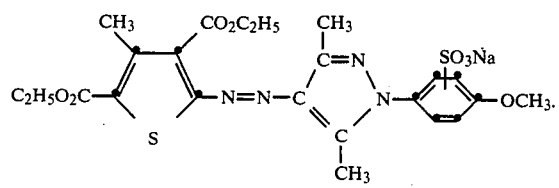

EXAMPLE 7

Sulfonation With 100% Sulfuric Acid

The dye (2.0 g) of the structure

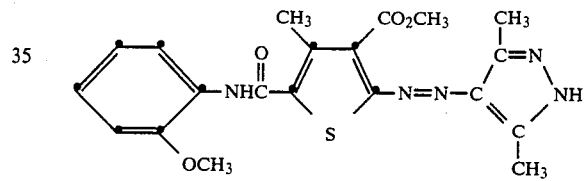

prepared by diazotizing the corresponding substituted 2-aminothiophene and coupling with 2,4-pentanedione, followed by ring closure with hydrazine as illustrated in the preceding examples, was added portionwise to 100% $H_2SO_4$ (15 ml) with stirring at about 25° C. Stirring was continued for 15 min. at which time thin-layer chromatography indicated complete reaction. After being drowned on ice the mixture was treated with 10 ml of acetic acid and the sulfuric acid then neutralized by adding 50% NaOH. The mixture was heated to about 80° C., allowed to cool, filtered, washed with 10% NaCl solution and dried to yield 2.2 g of dye having the structure

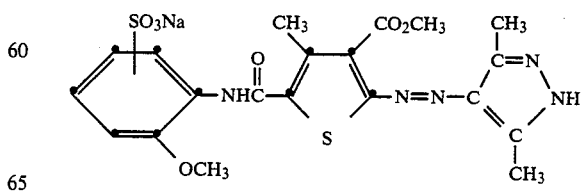

The following table gives additional specific dyes of the present invention.

TABLE I

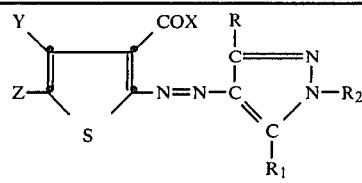

| Ex. | X | Y | Z | R | R₁ | R₂ |
|---|---|---|---|---|---|---|
| 6 | $OC_2H_5$ | $CH_3$ | $CO_2C_2H_5$ | $CH_3$ | $C_6H_5$ | $C_2H_4OSO_3Na$ |
| 7 | $OC_2H_5$ | $CH_3$ | $CO_2C_2H_5$ | $C_6H_5$ | $C_6H_5$ | $C_2H_4OSO_3Na$ |
| 8 | $OC_2H_5$ | $CH_3$ | $CO_2C_2H_5$ | $C_6H_5$ | $C_6H_5$ | $C_2H_4OSO_3K$ |
| 9 | $CH_3$ | $CH_3$ | $CO_2C_2H_5$ | $CH_3$ | $CH_3$ | $C_2H_4OSO_3H$ |
| 10 | $OC_2H_5$ | H | $C_2H_5$ | $CH_3$ | $CH_3$ | $C_2H_4OSO_3NH_4$ |
| 11 | $OC_2H_5$ | H | $CO_2C_2H_5$ | $CH_3$ | $CH_3$ | $C_2H_4OSO_3NH(CH_3)_3$ |
| 12 | $O-CH_2-CH=CH_2$ | $CH_3$ | Ph | $CH_3$ | $CH_3$ | $C_2H_4OSO_3NH(C_2H_5)_3$ |
| 13 | $OC_2H_5$ | $C_2H_5$ | $CO_2C_2H_4-N\text{(phthalimide)}$ | $C_2H_5$ | $CH_3$ | $CH_2CHCH_3$<br>$\|$<br>$OSO_3Na$ |
| 14 | $OCH_2CH_2CN$ | $CH_3$ | $CO_2C_2H_5$ | $C_2H_5$ | $CH_3$ | $CH_2CH_2OSO_3H$ |
| 15 | $OCH_3$ | Ph | $CO_2C_2H_5$ | $C_2H_5$ | $C_2H_5$ | $CH_2CH_2OSO_3H$ |
| 16 | $OCH_3$ | $CH_3$ | $SO_2CH_3$ | $CH_3$ | $CH_3$ | $CH_2CH_2OSO_3H$ |
| 17 | $OCH_2CH_2CONHC_2H_5$ | $CH_3$ | $CO_2C_2H_5$ | $CH_3$ | $CH_3$ | $CH_2CH_2SSO_3Na$ |
| 18 | $OCH_3$ | $CH_3$ | $CO_2C_2H_5$ | $CH_3$ | $CH_3$ | $CH_2CH_2SO_3Na$ |
| 19 | Ph—p-$CF_3$ | $CH_3$ | $CO_2C_2H_5$ | $CH_3$ | $CH_3$ | $CH_2CHCH_2SO_3Na$<br>$\|$<br>$OH$ |
| 20 | $OCH_3$ | $C_2H_5$ | CN | $CH_3$ | $CH_3$ | $CH_2$—C₆H₄-$SO_3Na$ |
| 21 | $OCH_2CH_2CN$ | $C_2H_5$ | $CO_2C_4H_9-n$ | $CH_3$ | $CH_3$ | (benzothiazolyl-$SO_3Na$) |
| 22 | Ph | $C_2H_5$ | $CO_2CH_2CH(CH_3)_2$ | $C_4H_9-n$ | $CH_3$ | $CH_2CH_2O$—C₆H₄—$SO_3Na$ |
| 23 | $OCH_2Ph$ | $CH_3$ | $CO_2CH_2CH(C_2H_5)C_4H_9-n$ | $C_4H_9-n$ | $CH_3$ | —C₆H₄—$SO_3Na$ |
| 24 | $OCH_3$ | $CH_3$ | $CO_2CH_3$ | $C_4H_9-n$ | $CH_3$ | —C₆H₃($SO_3Na$)($C_2H_5$) |
| 25 | $OCH_3$ | $CH_3$ | $CH_3$ | $C_4H_9-n$ | $C_4H_9-n$ | —C₆H₂($SO_3Na$)(Cl)(Cl) |
| 26 | $OC_2H_5$ | $CH_3$ | $CO_2C_2H_5$ | $CH_3$ | $CH_3$ | —C₆H₄—$OC_2H_4OSO_3Na$ |
| 27 | $OCH_3$ | $CH_3$ | $CO_2CH_3$ | $CH_3$ | $CH_3$ | —C₆HCl₃—$SO_3Na$ |
| 28 | $OCH_3$ | $CH_3$ | $CO_2Ph$ | $CH_3$ | $CH_3$ | —C₆H₃(Cl)—$SO_3K$ |

TABLE I-continued

Structure: thiophene ring with substituents Y, Z, COX, and N=N azo linkage to pyrazole ring with R, R₁, R₂ (N-R₂).

| Ex. | X | Y | Z | R | R₁ | R₂ |
|---|---|---|---|---|---|---|
| 29 | $NH_2$ | $C_4H_9$—n | $CO_2CH_3$ | $CH_3$ | $CH_3$ | phenyl with $SO_3H$ and $CH_3$ |
| 30 | $OCH_3$ | $CH_3$ | COPh | $CH_3$ | $CH_3$ | phenyl-$OC_2H_4OSO_3Na$ |
| 31 | $NHC_2H_5$ | $CH_3$ | $CO_2CH_3$ | $CH_3$ | $CH_3$ | phenyl-$C_2H_4OSO_3Na$ |
| 32 | $OCH_3$ | $CH_3$ | $CONHC_2H_4OSO_3Na$ | $CH_3$ | $CH_3$ | quinolinyl |
| 33 | $OCH_3$ | $CH_3$ | $CONHC_2H_4OSO_3Na$ | $CH_3$ | $CH_3$ | phenyl |
| 34 | phenyl with $OCH_3$, NH, $SO_3Na$ | H | $COCH_3$ | $C_3H_7$—n | $C_3H_7$—n | H |
| 35 | $OCH_3$ | H | furyl-$SO_3Na$ | $CH_3$ | $CH_3$ | H |
| 36 | $OC_6H_{11}$ | H | $COCH(CH_3)_2$ | $CH_3$ | $CH_3$ | $CH_2CH_2OSO_3Na$ |
| 37 | $OCH_3$ | H | CO-thienyl | $CH_3$ | $CH_3$ | phenyl-$SO_3Na$ |
| 38 | $OCH_3$ | H | CN | $CH_3$ | $CH_3$ | phenyl-$SO_3Na$ |
| 39 | $NHC_6H_{11}$ | H | CN | $C_6H_5$ | $C_6H_5$ | $CH_2CH_2CH_2OSO_3Na$ |
| 40 | $OCH_3$ | H | $SO_2CH_3$ | $CH_3$ | $CH_3$ | $CH_2$-phenyl-$SO_3Na$ |
| 41 | $OCH_2CH_2NHCOCH_3$ | H | Ph | $CH_3$ | $CH_3$ | $CH_2CH_2OSO_3H$ |
| 42 | $N(C_2H_5)_2$ | H | $C_2H_5$ | $CH_3$ | $CH_3$ | $CH_2CH_2OSO_3H$ |
| 43 | $OCH_3$ | $CH_3$ | CONHPh | $CH_3$ | $CH_3$ | $CH_2CH_2OSO_3H$ |
| 44 | $OC_4H_9$—n | $CH_3$ | $CO_2C_4H_9$—n | $CH_3$ | $CH_3$ | $CH_2CH_2OSO_3H$ |
| 45 | $OCH_2CH_2CH(CH_3)_2$ | $CH_3$ | $CO_2CH(CH_3)_2$ | $CH_3$ | $CH_3$ | $CH_2CH_2OSO_3H$ |
| 46 | $OC_{10}H_{21}$—n | $CH_3$ | $CO_2CH_3$ | $CH_3$ | $CH_3$ | $CH_2CH_2OSO_3H$ |
| 47 | $OC_8H_{17}$—n | $CH_3$ | $CO_2CH_2CH(C_2H_5)C_4H_9$—n | $CH_3$ | $CH_3$ | $CH_2CH_2OSO_3H$ |
| 48 | $OCH_3$ | $CH_3$ | $CO_2C_2H_4OC_2H_5$ | $CH_3$ | $CH_3$ | $CH_2CH_2OSO_3H$ |
| 49 | $NCH_3(Ph)$ | $CH_3$ | $CO_2C_2H_4OC_2H_4OC_2H_5$ | $CH_3$ | $CH_3$ | $CH_2CH_2OSO_3H$ |
| 50 | $OCH_2CH_2OSO_3Na$ | $CH_3$ | $CO_2CH_2Ph$ | $CH_3$ | $CH_3$ | H |
| 51 | $NHC_2H_4OSO_3H$ | $CH_3$ | $CO_2CH_2CH_2OPh$ | $CH_3$ | $CH_3$ | H |
| 52 | $NHC_2H_4OSO_3H$ | $CH_3$ | $CO_2C_2H_4Cl$ | $CH_3$ | $CH_3$ | H |
| 53 | $NHC_2H_4OSO_3H$ | $CH_3$ | $CO_2C_2H_4CN$ | $CH_3$ | $CH_3$ | H |
| 54 | $NHC_2H_4OSO_3H$ | $CH_3$ | $CO_2Ph$ | $CH_3$ | $CH_3$ | $CH_2C_6H_{11}$ |

TABLE I-continued

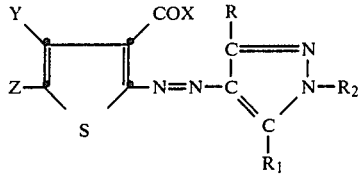

| Ex. | X | Y | Z | R | R₁ | R₂ |
|---|---|---|---|---|---|---|
| 55 | OCH₃ | CH₃ | CO₂C₂H₄N(COCH₂)₂ (morpholino-dione) | CH₃ | CH₃ | C₂H₄OSO₃H |
| 56 | OCH₃ | CH₃ | CO₂C₂H₄NHCOCH₃ | CH₃ | CH₃ | C₂H₄OSO₃H |
| 57 | NH₂ | CH₃ | COCH₃ | CH₃ | CH₃ | CH₂CH₂OSO₃H |
| 58 | NH₂ | CH₃ | COC₂H₅ | CH₃ | CH₃ | —C₆H₄—SO₃H |
| 59 | NHC₂H₄OSO₃H | H | (CH₃)₂CHCO | CH₃ | CH₃ | H |
| 60 | NHC₂H₄OSO₃K | Ph | COPh | CH₃ | CH₃ | H |
| 61 | NHC₂H₄OSO₃Na | Ph | CN | CH₃ | CH₃ | H |
| 62 | NHC₂H₄OSO₃NH₄ | H | CO₂C₂H₅ | CH₃ | CH₃ | H |
| 63 | NHC₂H₄OSO₃NH(CH₃)₃ | H | CO₂CH(CH₃)₂ | CH₃ | CH₃ | H |
| 64 | NHC₂H₄OH | H | CONH—C₆H₃(SO₃Na) | CH₃ | CH₃ | H |
| 65 | NHC₂H₅ | CH₃ | CONH—C₆H₃(OC₂H₅)(SO₃Na) | CH₃ | CH₃ | H |
| 66 | NHCH₂CH₂CH₂OCH₃ | CH₃ | CONH—C₆H₃(Cl)(SO₃Na) | CH₃ | CH₃ | H |
| 67 | NHC₄H₉—n | CH₃ | CONH—C₆H₃(OCH₃)(SO₃Na) | CH₃ | CH₃ | H |
| 68 | NHC₂H₄OC₂H₄OH | CH₃ | CONH—C₆H₃(OCH₃)(SO₃Na) | CH₃ | CH₃ | 2-pyridyl |
| 69 | NHC₂H₄OCOCH₃ | CH₃ | CONH—C₆H₃(OCH₃)(SO₃Na) | CH₃ | CH₃ | CONH₂ |
| 70 | N(C₂H₅)₂ | CH₃ | CONH—C₆H₃(OCH₃)(SO₃Na) | CH₃ | CH₃ | CO—C₆H₅ |
| 71 | N(CH₃)Ph | CH₃ | CONH—C₆H₃(OCH₃)(SO₃Na) | CH₃ | CH₃ | COC₂H₅ |
| 72 | OCH₃ | CH₃ | CONH—C₆H₃(OCH₃)(SO₃Na) | CH₃ | CH₃ | —CH(CH₂—)CH₂—SO₂(—CH₂—) (sulfolanyl) |

TABLE I-continued

| Ex. | X | Y | Z | R | $R_1$ | $R_2$ |
|---|---|---|---|---|---|---|
| 73 | $OCH_3$ | $CH_3$ | CONH—[C₆H₃(OCH₃)(SO₃Na)] | $CH_3$ | $CH_3$ | $\underset{\|}{C}(=S)-NH_2$ |
| 74 | $OCH_2CH(C_2H_5)C_4H_9-n$ | $CH_3$ | CONH—[C₆H₃(OCH₃)(SO₃Na)] | $CH_3$ | $CH_3$ | $CH_3$ |
| 75 | Ph | $CH_3$ | CONH—[C₆H₃(OCH₃)(SO₃Na)] | $CH_3$ | $CH_3$ | benzothiazol-2-yl |
| 76 | $OCH_3$ | $CH_3$ | CONH—[C₆H₃(OCH₃)(SO₃Na)] | $C_2H_5$ | $C_2H_5$ | —C₆H₄—$CO_2C_2H_5$ |
| 77 | $OCH_3$ | $CH_3$ | $CONHC_2H_4OSO_3Na$ | $C_2H_5$ | $C_2H_5$ | H |
| 78 | $OCH_3$ | $CH_3$ | $CONHC_2H_4OSO_3Na$ | $C_2H_5$ | $C_2H_5$ | $CH_2CH_2OH$ |
| 79 | $OCH_3$ | $CH_3$ | $CO_2CH_3$ | $CH_3$ | $CH_3$ | tetrahydrothiophene-1,1-dioxide-3-yl |
| 80 | $NHC_2H_4OSO_3Na$ | $CH_3$ | $NHC_2H_4OSO_3Na$ | $CH_3$ | $CH_3$ | H |
| 81 | $NHC_2H_4OCCH_2CH_3$ (O=) | $CH_3$ | $NHC_2H_4OCCH_2CH_3$ (O=) | $CH_3$ | $CH_3$ | —C₆H₄—$SO_3Na$ |
| 82 | $NHC_8H_{17}-n$ | $CH_3$ | $CO_2C_2H_5$ | $CH_3$ | $CH_3$ | —C₆H₄—$SO_3Na$ |
| 83 | $OCH_3$ | $CH_3$ | CO—[C₆H₄—$SO_3H$] | $CH_3$ | $CH_3$ | H |
| 84 | $OCH_3$ | H | $COCH(CH_3)_2$ | $CH_3$ | $CH_3$ | benzothiazol-2-yl (SO₃Na subst.) |
| 85 | $OCH_3$ | Ph | $COCH_3$ | $CH_3$ | $CH_3$ | $CH_2CH_2OSO_3Na$ |
| 86 | Ph | H | $COCH_3$ | $CH_3$ | $CH_3$ | $CH_2CH_2OSO_3H$ |
| 87 | NH—[thiophene] | $CH_3$ | $CO_2C_2H_5$ | $CH_3$ | $CH_3$ | $CH_2CH_2OSO_3H$ |
| 88 | O—[thiophene] | $CH_3$ | $CONHC_2H_4OSO_3Na$ | $CH_3$ | $CH_3$ | H |
| 89 | $OCH_2C_6H_4SO_3Na$ | $CH_3$ | $CO_2C_2H_5$ | $CH_3$ | $CH_3$ | H |

TABLE I-continued

Structure:
Y—C(COX)=C(Z)... with Z-C(Y)=C(COX)-C(CH3)=N-N=C-... pyrazole ring with R, R1, R2 substituents

| Ex. | X | Y | Z | R | R1 | R2 |
|---|---|---|---|---|---|---|
| 90 | OC2H5 | CH3 | CONH-(2-OCH3, 5-SO3Na phenyl) | CH3 | CH3 | H |
| 91 | OC2H5 | CH3 | CONH-(2-OCH3, 5-SO3Na phenyl) | CH3 | CH3 | -CH2-CH(—CH2-SO2-CH2—) (sulfolane ring) |
| 92 | OCH3 | CH3 | CONHCH2-(thiophene)-CH2OSO3Na | CH3 | CH3 | H |
| 93 | OCH3 | CH3 | CONHCH2CH(OSO3Na)CH2OSO3Na | CH3 | CH3 | H |
| 94 | OCH3 | CH3 | CONH-(2-OCH3, 5-SO3Na phenyl) | CH3 | CH3 | CH2CH2OSO3Na |
| 95 | OCH3 | CH3 | CONHCH2CH2-(phenyl)-SO3Na | CH3 | CH3 | CH2CH2OH |
| 96 | OCH3 | CH3 | CO2CHCH2O-(phenyl)-SO3Na | CH3 | CH3 | H |
| 97 | OCH3 | CH3 | CO2CH2CH2OCH3CH2OSO3Na | CH3 | CH3 | H |
| 98 | OCH3 | CH3 | CONHCH2-(phenyl)-SO3Na | CH3 | CH3 | H |
| 99 | OCH3 | CH3 | CONH-(furan)-SO3Na | CH3 | CH3 | H |
| 100 | OCH3 | H | CO-(thiophene)-SO3Na | CH3 | CH3 | H |
| 101 | OCH3 | H | benzothiazol-2-yl | CH3 | CH3 | CH2CH2OSO3Na |
| 102 | OC2H5 | H | benzothiazol-2-yl | CH3 | CH3 | -(phenyl)-SO3Na |

The invention has been described in detail with particular reference to preferred embodiments thereof, but it will be understood that variations and modifications can be effected within the spirit and scope of the invention.

I claim:

1. A dye having the formula

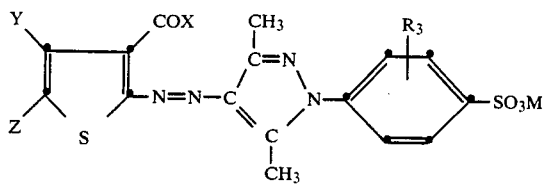

wherein X is alkoxy; Y is hydrogen or alkyl; Z is carbalkoxy, aryl, acyl, cyano, or CONHaryl; wherein the alkyl groups or moieties of each of the X, Y and Z substituents are unsubstituted or substituted with hydroxy, alkanoyloxy, halogen, cyano, carbalkoxy, aryl, aryloxy, alkanoylamino, succinimido, phthalimido, alkoxy, or alkoxyalkoxy; $R_3$ is one or more groups selected from hydrogen, halogen, alkyl, and alkoxy; and wherein $SO_3M$, $OSO_3M$, or $SSO_3M$ group may be present on X, Y or Z wherein M is a colorless anion.

2. A dye having the formula

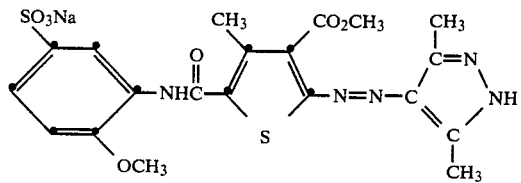

wherein X is alkoxy; Y is alkyl; wherein the alkyl group of each of the X and Y substituents are unsubstituted or substituted with hydroxy, alkanoyloxy, halogen, cyano, carbalkoxy, aryl, aryloxy, alkanoylamino, succinimido, phthalimido, alkoxy, or alkoxyalkoxy; $R_2$ is hydrogen, alkyl, hydroxyethyl, aryl, 3-sulfolanyl, benzyl, or 2-benzothiazolyl; wherein $SO_3M$, $OSO_3M$, or $SSO_3M$ group may be present on X, Y or $R_2$ wherein M is a colorless anion; and $R_3$ is 1-3 groups selected from hydrogen, halogen, alkoxy and alkyl.

3. The dye according to claim 2 having the formula

* * * * *